US010762159B2

(12) United States Patent
Lei

(10) Patent No.: US 10,762,159 B2
(45) Date of Patent: Sep. 1, 2020

(54) METHOD AND SYSTEM FOR INCREASING PAGE LOADING RATE

(71) Applicants:BEIJING JINGDONG SHANGKE INFORMATION TECHNOLOGY CO., LTD., Haidian District, Beijing (CN); BEIJING JINGDONG CENTURY TRADING CO., LTD., Beijing (CN)

(72) Inventor: Ning Lei, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 449 days.

(21) Appl. No.: 15/542,084

(22) PCT Filed: Jan. 7, 2016

(86) PCT No.: PCT/CN2016/070400
§ 371 (c)(1),
(2) Date: Jul. 7, 2017

(87) PCT Pub. No.: WO2016/112826
PCT Pub. Date: Jul. 21, 2016

(65) Prior Publication Data
US 2018/0276308 A1  Sep. 27, 2018

(30) Foreign Application Priority Data

Jan. 12, 2015 (CN) .......................... 2015 1 0015200

(51) Int. Cl.
*G06F 15/16* (2006.01)
*G06F 16/957* (2019.01)
(Continued)

(52) U.S. Cl.
CPC .......... *G06F 16/9574* (2019.01); *G06F 16/00* (2019.01); *G06F 16/986* (2019.01);
(Continued)

(58) Field of Classification Search
CPC .... G06F 16/00; G06F 16/9574; G06F 16/986; H04L 67/02; H04L 67/1002; H04L 67/2842
See application file for complete search history.

(56) References Cited

U.S. PATENT DOCUMENTS 8,516,041 B1    8/2013  Miles
2002/0163882 A1*  11/2002  Bornstein ............... H04L 29/06
370/227
(Continued)

FOREIGN PATENT DOCUMENTS

CN    101770511 A    7/2010
CN    102185923 A    9/2011
(Continued)

OTHER PUBLICATIONS

International Search Report with English translation and Written Opinion for Application No. PCT/CN2016/070400 dated Apr. 11, 2016 (10 pages).
(Continued)

*Primary Examiner* — Ryan J Jakovac
(74) *Attorney, Agent, or Firm* — Michael Best & Friedrich LLP

(57) ABSTRACT

A method and system for increasing a page loading rate, the method comprising: a Content Delivery Network receiving a page framework request sent by a browser, and launching a page framework request to a server; the server rendering a page framework on the basis of the page framework request, and sending the page framework to the browser by the Content Delivery Network; the browser parsing the page
(Continued)

framework to obtain a page module identifier, and launching a page module request including the page module identifier to the server by the Content Delivery Network; the server rendering a page module on the basis of the page framework module request, and sending the page module to the Content Delivery Network; and the Content Delivery Network populating the page module into the page framework to form a page on the basis of the page module identifier, and sending the page to the browser.

10 Claims, 4 Drawing Sheets

(51) Int. Cl.
    *G06F 16/958*     (2019.01)
    *G06F 16/00*     (2019.01)
    *H04L 29/08*     (2006.01)

(52) U.S. Cl.
    CPC ...... *H04L 67/1002* (2013.01); *H04L 67/2842* (2013.01); *H04L 67/02* (2013.01)

(56) References Cited

U.S. PATENT DOCUMENTS

| | | | |
|---|---|---|---|
| 2004/0254952 A1* | 12/2004 | Narazaki | ............... G06F 16/972 |
| 2012/0066586 A1 | 3/2012 | Shemesh | |
| 2012/0254432 A1* | 10/2012 | Roseborough | .......... H04L 47/70 709/226 |
| 2012/0303697 A1 | 11/2012 | Alstad | |
| 2013/0073946 A1 | 3/2013 | Kang et al. | |
| 2013/0332253 A1* | 12/2013 | Shiffert | ................. G06Q 30/02 705/14.26 |
| 2014/0201617 A1 | 7/2014 | Liang | |
| 2015/0350341 A1* | 12/2015 | Daute | ................. H04L 67/1004 714/38.1 |

FOREIGN PATENT DOCUMENTS

| | | |
|---|---|---|
| CN | 102917074 A | 2/2013 |
| CN | 104573025 A | 4/2015 |
| RU | 2011149242 A | 6/2013 |
| WO | 2014189728 A1 | 11/2014 |

OTHER PUBLICATIONS

Indonesia Patent Office Action for Application No. P00201704477 dated Jan. 9, 2020 (3 pages, English translation included).
Japan Patent Office Action for Application No. 2017-536841 dated Jul. 10, 2018 (3 pages).
Russia Patent Office Action for Application No. 2017128099 dated Aug. 17, 2018 (11 pages, English translation included).
India Patent Office Examination Report for Application No. 201727028346 dated Jun. 29, 2020 (6 pages).

* cited by examiner

METHOD AND SYSTEM FOR INCREASING PAGE LOADING RATE

CROSS-REFERENCE TO RELATED APPLICATIONS

This application is a national stage filing under 35 U.S.C. 371 of International Application No. PCT/CN2016/070400 filed Jan. 7, 2016, which claims the foreign priority benefit of Chinese Patent Application No. 201510015200.9 filed Jan. 12, 2015, which are incorporated by reference herein in their entireties.

TECHNICAL FIELD

The present invention relates to the Internet technology field, and particularly to a method and system for increasing a page loading rate.

BACKGROUND ART

In the present network environment, a HTML (HyperText Mark-up Language) page accessed by a user may not change for a long time, so the page may be processed with the page staticize technology to increase the page loading rate.

In the page staticize technology, a page rendered dynamically by an application server is cached to a hard disk of a Web (Internet) server, and the page cached in the hard disk is read directly by the application server without need in being rendered when the user requests to access the page.

At present, based on the page staticize technology, the main process of a user accessing a page is shown as in FIG. 1:

At Step S101, a CDN (Content Delivery Network) cluster receives a page access request sent by a user;

At step S102, the CDN cluster determines whether or not a page corresponding to the page access request is cached. If so, the process proceeds to Step S108; and if not, the process proceeds to Step S103;

At Step S103, the CDN cluster forwards the page access request to a Web server;

At Step S104, the Web server receives the page access request, determines whether or not a page corresponding to the page access request is cached in a hard disk. If so, the process proceeds to Step S108; and if not, the process proceeds to Step S105;

At Step S105, the Web server forwards the page access request to the application server, the application server performs multi-threaded rendering on the page corresponding to the page access request, and returns the rendered page to the Web server;

At step S106, the Web server caches the rendered page on the hard disk and sends the rendered page to the CDN cluster;

At step S107, the CDN cluster receives the rendered page and caches it;

At step S108, the CDN cluster returns the rendered page to a browser, and the browser parses the rendered page.

The present application server renders the entire page via a thread pool. But when the number of the page access requests exceeds the maximum of the thread pool, a rendering task that is not allocated with thread resources will be blocked so that the page cannot be loaded or the loading time times out, and the user experience is very poor.

SUMMARY OF INVENTION

The present invention provides a method and system for increasing a page loading speed in the embodiments to realize asynchronous rendering of the page framework and the page module, thereby reducing the page loading rate.

On one hand, the embodiments of the present invention provide a method for increasing a page loading rate, comprising:

a Content Delivery Network receiving a page framework request sent by a browser, and launching the page framework request to a server;

the server rendering a page framework on the basis of the page framework request, and sending the rendered page framework to the browser by means of the Content Delivery Network;

the browser parsing the rendered page framework to obtain a page module identifier, and launching a page module request including the page module identifier to the server by means of the Content Delivery Network;

the server rendering a page module on the basis of the page module request, and sending the rendered page module to the Content Delivery Network; and the Content Delivery Network populating the rendered page module into the rendered page framework to form a page on the basis of the page module identifier, and sending the page to the browser.

Preferably, the Content Delivery Network receiving a page framework request sent by a browser, and launching the page framework request to a server specifically comprises:

the Content Delivery Network receiving the page framework request, determining whether or not a rendered page framework is cached, and if not, sending the page framework request to the server.

Preferably, the server rendering a page framework on the basis of the page framework request, and sending the rendered page framework to the browser by means of the Content Delivery Network, specifically comprises:

an Internet server receiving the page framework request sent by the Content Delivery Network, determining whether or not a rendered page framework is cached, and if not, sending the page framework request to an application server;

the application server rendering the page framework on the basis of the page framework request, and sending the rendered page framework to the Internet server; and the Internet server receiving the rendered page framework, caching the rendered page framework in a memory, and sending the rendered page framework to the browser by means of the Content Delivery Network.

Preferably, the sending the rendered page framework to the browser by means of the Content Delivery Network comprises:

the Internet server sending the rendered page framework to the Content Delivery Network, the Content Delivery Network receiving the rendered page framework, caching the rendered page framework, and sending the rendered page framework to the browser.

Preferably, the launching a page module request including the page module identifier to the server by means of the Content Delivery Network specifically comprises:

the browser sending the page module request to the Content Delivery Network; and the Content Delivery Network receiving the page module request, determining whether or not a rendered page module is cached, and if not, sending the page module request to the server.

Preferably, the server rendering a page module on the basis of the page module request, and sending the rendered page module to the Content Delivery Network specifically comprises:

an Internet server receiving the page module request, determining whether or not the rendered page framework request needs to be cached, if not, sending the page module request to an application server; if so, determining whether or not the rendered page module is cached, and if not, sending the page module request to the application server;

the application server rendering the page module on the basis of the page module request, caching the rendered page module in a memory, and sending the rendered page module to the Internet server; and the Internet server receiving the rendered page module, caching the rendered page module in a memory, and sending the rendered page module to the Content Delivery Network.

Preferably, the Content Delivery Network populating the rendered page module into the rendered page framework to form a page on the basis of the page module identifier, and sending the page to the browser, specifically comprises:

the Content Delivery Network determining whether or not a process of the server rendering a page module times out, if not, populating the rendered page module into the rendered page framework to form a page, and sending the page to the browser.

On the other hand, the embodiments of the present invention provide system for increasing a page loading rate, characterized in comprising:

a Content Delivery Network, a server and a browser, the Content Delivery Network being used for receiving a page framework request sent by the browser, and launching the page framework request to the server;

the server being used for rendering a page framework on the basis of the page framework request, and sending the rendered page framework to the browser by means of the Content Delivery Network, the browser being used for parsing the rendered page framework to obtain a page module identifier, and launching a page module request including the page module identifier to the server by means of the Content Delivery Network, and the server being used for rendering a page module on the basis of the page module request and sending the rendered page module to the Content Delivery Network; and the Content Delivery Network being used for populating the rendered page module into the rendered page framework to form a page on the basis of the page module identifier, and sending the page to the browser.

Preferably, the Content Delivery Network is specifically used for receiving the page framework request, determining whether or not a rendered page framework is cached, and if not, sending the page framework request to the server.

Preferably, the server includes an Internet server and an application server, the Internet server being used for receiving the page framework request sent by the Content Delivery Network, determining whether or not a rendered page framework is cached, and if not, sending the page framework request to the application server;

the application server being used for rendering the page framework on the basis of the page framework request, and sending the rendered page framework to the Internet server; and the Internet server being used for receiving the rendered page framework, caching the rendered page framework in a memory, and sending the rendered page framework to the browser by means of the Content Delivery Network.

Preferably, the Content Delivery Network is specifically used for receiving the rendered page framework sent by the Internet server, caching the rendered page framework, and sending the rendered page framework to the browser.

Preferably, the browser is used for sending the page module request to the Content Delivery Network; and the Content Delivery Network is specifically used for receiving the page module request, determining whether or not the rendered page module is cached, and if not, sending the page module request to the server.

Preferably, the Internet server is used for receiving the page module request, determining whether or not the rendered page framework request needs to be cached, and if not, sending the page module request to the server, if so, determining whether or not the rendered page module is cached, and if not, sending the page module request to the application server;

the application server is used for rendering the page module on the basis of the page module request, caching the rendered page module in the memory, and sending the rendered page module to the Internet server; and the Internet server is used for receiving the rendered page module, caching the rendered page module in the memory, and sending the rendered page module to the Content Delivery Network.

Preferably, the Content Delivery Network is specifically used for determining whether or not process of the server rendering a page module times out, and if not, populating the rendered page module into the rendered page framework to form a page, and sending the page to the browser.

The invention provides a method and system for increasing a page loading rate in the embodiments. In a method for increasing a page loading rate provided by the invention in the embodiments, by means of rendering the page frame and the page module asynchronously, the page rendering request is distributed, the module rendering speed is speeded up, and the page loading rate is increased.

BRIEF DESCRIPTION OF DRAWINGS

In order to illustrate the technical solution in the embodiments of the present application more clearly, the drawings to be used in the description of the embodiments will be briefly described below. Obviously, the drawings described in the following are merely some embodiments, and other drawings may be obtained by those skilled in the art without inventive efforts.

DETAILED DESCRIPTION OF INVENTION

Figure 1:
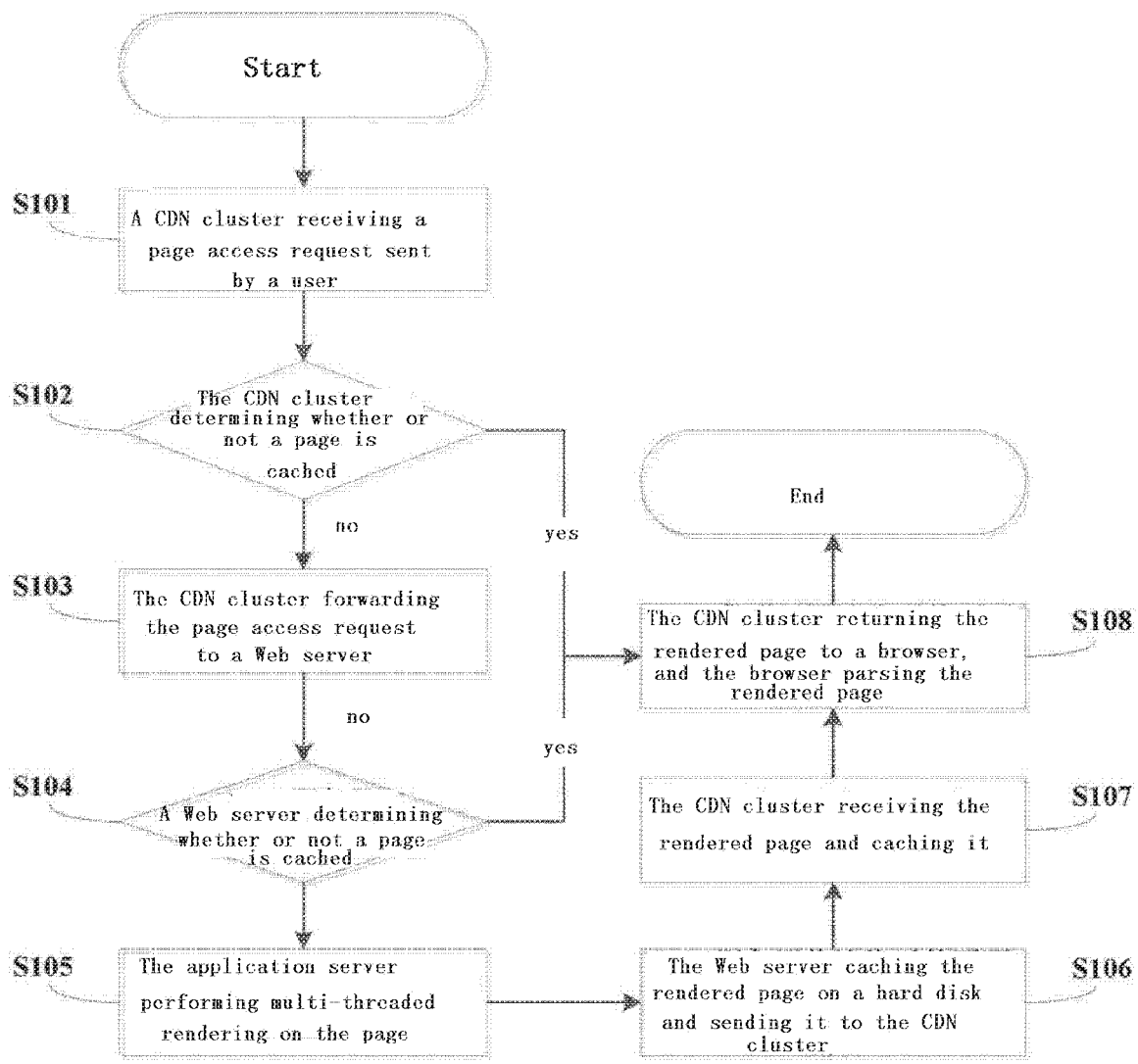
FIG. 1 is a flow diagram of a user accessing a page in the prior art.

The invention will now be described in further details with reference to the accompanying drawings and embodiments. It is to be understood that the specific embodiments described herein are for the purpose of explaining the invention only and not intended to limit the invention. It is to be noted that, only the parts related to the present invention rather than the entire structure are shown in the drawings for the sake of convenience of description.

Embodiment 1

Figure 2:
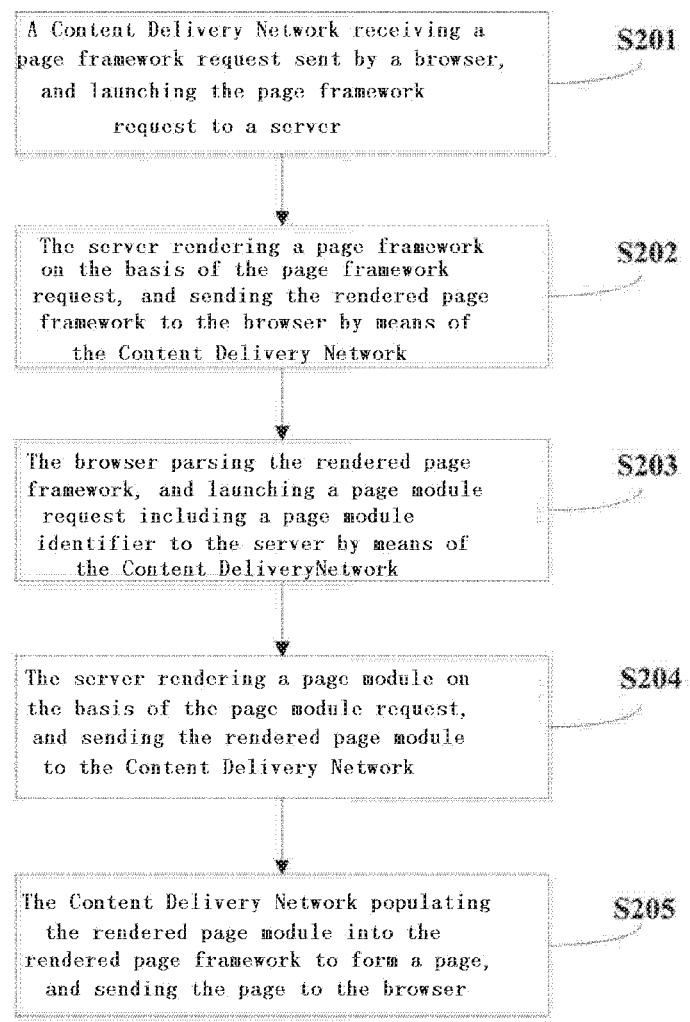
FIG. 2 is a flow diagram of a method for increasing a page loading rate provided in the embodiment of the present invention.

The embodiment of the invention provides a method for increasing a page loading rate. The method is applicable to the case of loading a page. As shown in FIG. 2, the method specifically comprises:

Step S201 of a Content Delivery Network receiving a page framework request sent by a browser, and launching the page framework request to a server;

At Step S201, the web development technology of an interactive web application created based on Ajax (Asynchronous JavaScript And XML) can realize asynchronous page updates. That is, a page framework may be rendered followed by rendering a page module, and then combine the rendered page framework and the rendered page module into a page. Thus, a Content Delivery Network (CDN) can receive a page framework request sent by a browser. The Content Delivery Network can determine whether or not a rendered page framework is cached, if so, the rendered page framework may be sent directly to the browser to realize rapid response to the page framework request, in order to improve the page loading rate; if not, the page framework request may be launched to the server to obtain the rendered page framework.

Step S202 of the server rendering a page framework on the basis of the page framework request, and sending the rendered page framework to the browser by means of the Content Delivery Network.

At Step S202, the server receives the page framework request sent by the Content Delivery Network, and can determine whether or not the rendered page framework is cached in a local Redis (distributed storage system) cluster. If so, the cached rendered page framework may be sent to the browser by means of the Content Delivery Network; if not, the page framework may be rendered, and the rendered framework is sent to the browser by means of the Content Delivery Network. Besides, the rendered page framework may be cached in the local Redis cluster. Compared to caching a rendered page in a hard disk in the prior art, caching a rendered page framework in the local Redis cluster makes the access speed be improved, maintenance easy, and it possible to delete dynamically the cached contents from the server according to the service needs to ensure a front-end real-time browse and data consistency to save storage space.

For example, the rendered page framework is shown as follows:

```
... ...
    <div class="j_lazy_loading"moduleInstanceId="10001"
area="head" origin="0"templateId="1" prototype="1"></div>
    <div class="j_lazy_loading"moduleInstanceId="10002"
area="body" origin="1"templateId="2" prototype="2"></div>
    <div        class="j_lazy_loading"moduleInstanceId="10003"
area="footer" origin="0"templateId="3" prototype="3"></div>
    ... ...
</html>
```

Step S203 of the browser parsing the rendered page framework to obtain a page module identifier, and launching a page module request including the page module identifier to the server by means of the Content Delivery Network.

At Step S203, the rendered page framework can be a page framework with a DOM (Document Object Model) structure. The browser can use a JavaScript engine to parse the rendered page framework to obtain a page module identifier. The page module identifier may identify the location of the page module in the page framework and is the basis for populating the page module into the page framework. The browser can send the same number of page module requests based on the number of page modules.

Step S204 of the server rendering a page module on the basis of the page module request, and sending the rendered page module to the Content Delivery Network.

At Step S204, the server receives the page module request sent by the Content Delivery Network, and can determine whether or not the rendered page module is cached in the local Redis cluster. If so, the cached rendered page module may be sent to the browser by means of the Content Delivery Network. If not, the page module may be rendered, and the rendered page module is sent to the browser by means of the Content Delivery Network. Besides, the rendered page module may be cached to the local Redis cluster.

Step S205 of the Content Delivery Network populating the rendered page module into the rendered page framework to form a page on the basis of the page module identifier, and sending the page to the browser.

At Step S205, the Content Delivery Network populates the rendered page module into the rendered page framework to form a page of a JSON (JavaScript Object Notation) structure on the basis of the page module identifier.

For example, an instance of the JSON structure is shown as follows:

```
{
    "result":true,//identifying whether or not the module rendering is
successful
    "moduleText":"<div>.....</div>",//the module content HTML
    "moduleInstanceId":"10001"//the module identifier for retrieving the
location of the module in the page
}
```

In the method for increasing a page loading rate provided in the embodiment of the invention, by means of rendering the page framework and the page module asynchronously, the page rendering request is distributed, the module rendering speed is speeded up, and the page loading rate is increased.

Embodiment 2

Figure 3:
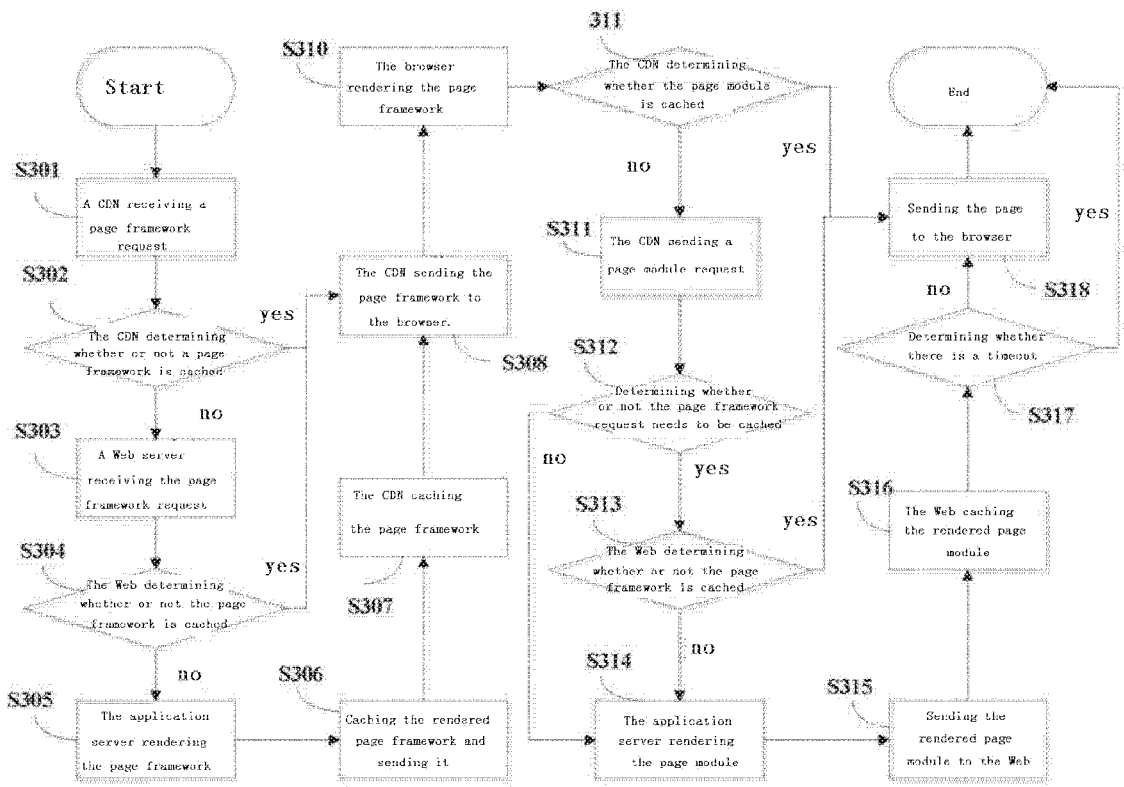
FIG. 3 is a flow diagram of a method for increasing a page loading rate provided in the embodiment of the present invention.

The embodiment of the invention provides a method for increasing a page loading rate. The method is applicable to the case of loading a page, and is based on a server including a Web (Internet) server and an application server. As shown in FIG. 3, the method specifically comprises:

Step S301 of a Content Delivery Network (CDN) receiving a page framework request.

Step S302 of the Content Delivery Network determining whether or not a page framework is cached, and if not, proceeding to Step S303, if so, proceeding to Step S308.

Step S303 of the Content Distribution Network sending a page framework request to the Internet, and an Internet (Web) server receiving the page framework request sent by the Content Delivery Network.

At Step S303, the Internet server is preferably a Nginx (a lightweight Web server/reverse proxy server and an e-mail proxy server), and if the page framework request conforms to the Nginx matching rule after the Nginx accepts the page framework request, the process proceeds to Step S304.

Step S304 of the Internet server determining whether or not the rendered page framework is cached, and if so, proceeding to Step S308, if not, proceeding to Step S305.

At Step S304, the Internet server may determine whether or not the rendered page framework is cached with the Lua scripting language.

Step S305 of the Internet server sending the page framework request to the application server, the application server rendering the page framework according to the page framework request, and sending the rendered page framework to the Internet server.

At Step S305, the application server may be an instance of a Tomcat (a free open source Web application server).

Step S306 of the Internet server receiving the rendered page framework, caching the rendered page framework in a memory, and sending the rendered page framework to the Content Delivery Network.

Step S307 of the Content Delivery Network receiving the rendered page framework, and caching the rendered page framework in a memory.

Step S308 of sending the rendered page framework to the browser.

Step S309 of the browser parsing the rendered page framework to obtain a page module identifier, and the browser sending the page module request to the Content Delivery Network.

Step S310 of the Content Delivery Network receiving the page module request, determining whether or not the rendered page module is cached, and if so, proceeding to Step S318, if not, proceeding to Step S311.

Step S311 of the Content Delivery Network sending the page module request to the Internet server.

Step S312 of the Internet server receiving the page module request, determining whether or not the rendered page framework request needs to be cached, and if not, proceeding to Step S314, if so, proceeding to Step S313.

At Step S312, some of the page modules need to be rendered in real time, such as a search module, then the search module does not need to be cached; some of the page modules do not need to be rendered in real time, such as a date module, then the date module does not need to be cached.

Step S313 of the Internet server determining whether or not the rendered page module is cached, and if so, sending the rendered page module to the Content Delivery Network, or if not, proceeding to Step S314.

Step S314 of the Internet server sending the page module request to the application server, the application server rendering the page module on the basis of the page module request, and caching the page module in the memory.

Step S315 of sending the rendered page module to the Internet server.

Step S316 of the Internet server receiving the rendered page module, caching the rendered page module in the memory, and sending the rendered page module to the Content Delivery Network.

Step S317 of the Content Delivery Network determining whether or not a process of the server rendering a page times out, and if not, proceeding to step S318, if so, ending the page module request.

Step S318 of populating the rendered page module into the rendered page framework to form a page framework, and sending the page to the browser.

In the method for increasing a page loading rate provided in the embodiment of the present invention, by means of rendering the page framework and the page module asynchronously, the page rendering request is distributed, the module rendering speed is speeded up, and the page loading rate is increased.

Embodiment 3

Figure 4:
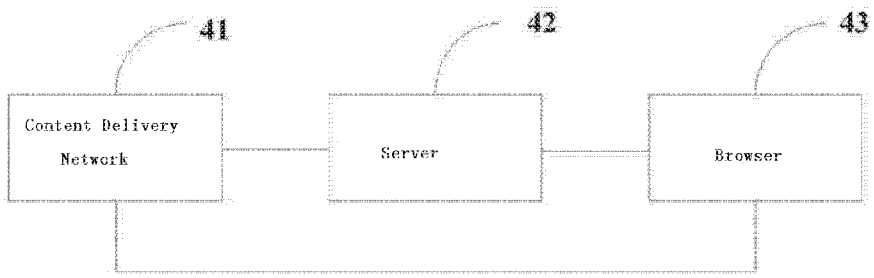
FIG. 4 is a schematic diagram of a system for increasing a page loading rate provided in the embodiment of the present invention.

The embodiment of the invention provides a system for increasing a page loading rate as shown in FIG. 4, the system comprises: a Content Delivery Network 41, a server 42 and a browser 43.

Wherein the Content Delivery Network 41 is used for receiving a page framework request sent by the browser, and launching the page framework request to the server; the server 42 is used for rendering a page framework on the basis of the page framework request, and sending the rendered page framework to the browser 43 by means of the Content Delivery Network; the browser 43 is used for parsing the rendered page framework to obtain a page module identifier, and launching a page module request including the page module identifier to the server 42 by means of the Content Delivery Network, then the server 42 is used for rendering a page module on the basis of the page module request and sending the rendered page module to the Content Delivery Network; and the Content Delivery Network 41 is used for populating the rendered page module into the rendered page framework to form a page on the basis of the page module identifier, and sending the page to the browser 43.

In the Content Delivery Network 41, asynchronous page updates may be realized based on Ajax (Asynchronous JavaScript And XML), that is a web development technology of creating an interactive web application. That is, a page framework may be rendered followed by rendering a page module, and then combine the rendered page framework and the rendered page module into a page. Thus, a Content Delivery Network (CDN) can receive a page framework request sent by a browser. The Content Delivery Network can determine whether or not a rendered page framework is cached, if so, the rendered page framework may be sent directly to the browser to realize rapid response to the page framework request to improve the page loading rate; if not, the page framework request may be launched to the server to obtain the rendered page framework.

The server 42 can receive the page framework request sent by the Content Delivery Network, and can determine whether or not the rendered page framework is cached in a local Redis cluster. If so, the cached rendered page framework may be sent to the browser by means of the Content Delivery Network; if not, the page framework may be rendered, and the rendered framework is sent to the browser by means of the Content Delivery Network. Besides, the rendered page framework may be cached in the local Redis cluster. Compared to caching a rendered page in a hard disk in the prior art, the access speed is improved, maintenance is easier, and it is possible to delete dynamically the cached contents from the server according to the service needs to ensure a front-end real-time browse and data consistency to save storage space.

In the browser 43, the rendered page framework can be a page framework with a DOM (Document Object Model) structure. The browser can use a JavaScript engine to parse the rendered page framework to obtain a page module identifier. The page module identifier may identify the location of the page module in the page framework and is the basis for populating the page module into the page framework. The browser can send the same number of page module requests based on the number of page modules.

The server 42 can further receive the page module request sent by the Content Delivery Network, and can determine whether or not the rendered page module is cached in the local Redis cluster. If so, the cached rendered page module may be sent to the browser by means of the Content Delivery Network. If not, the page module may be rendered, and the rendered page module is sent to the browser by means of the Content Delivery Network. Besides, the rendered page module may be cached to the local Redis cluster.

The Content Delivery Network 41 can further populate the rendered page module into the rendered page framework to form a page of a JSON (JavaScript Object Notation) structure on the basis of the page module identifier.

In the method for increasing a page loading rate provided in the embodiment of the invention, by means of rendering the page framework and the page module asynchronously, the page rendering request is distributed, the module rendering speed is speeded up, and the page loading rate is increased.

Embodiment 4

Figure 5:
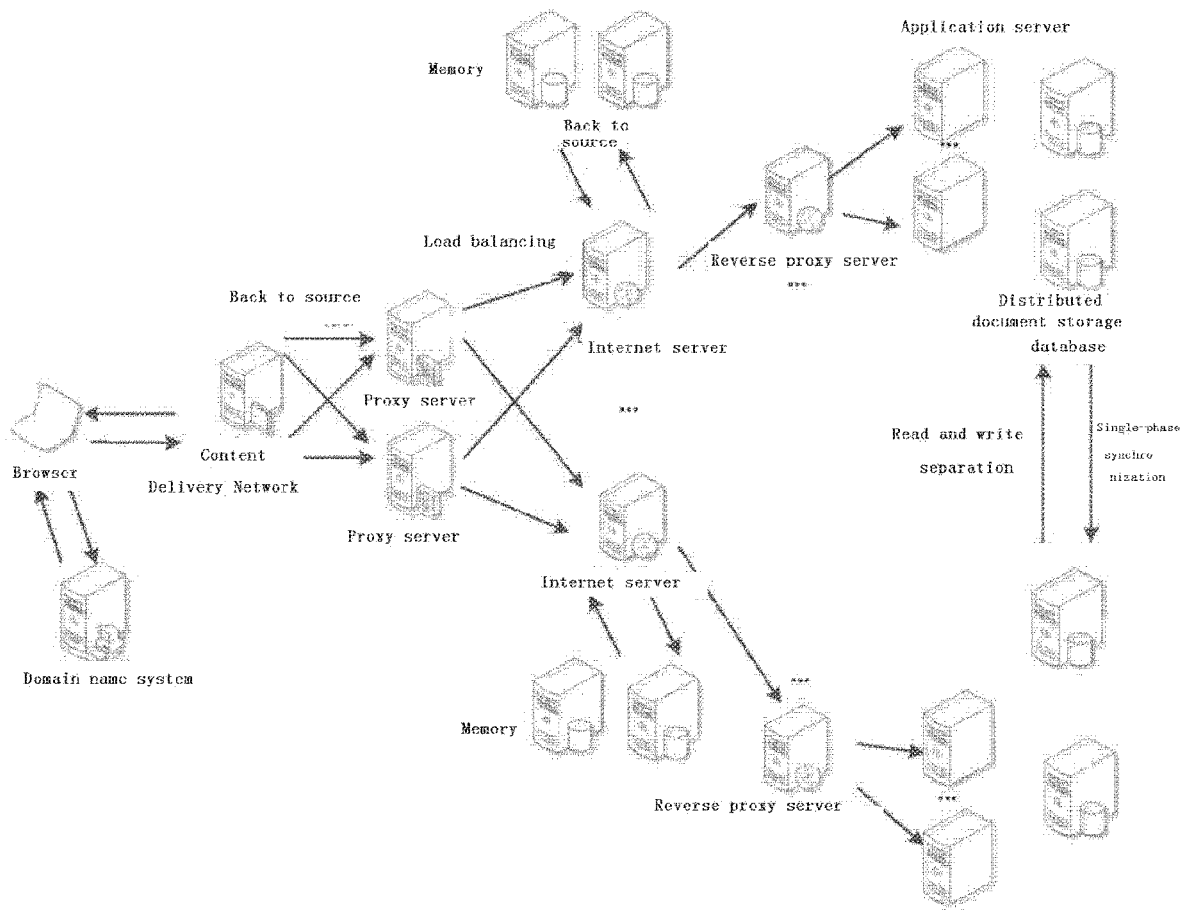
FIG. 5 is an application deployment diagram of a system for increasing a page loading rate provided in the embodiment of the present invention.
Figure 6:
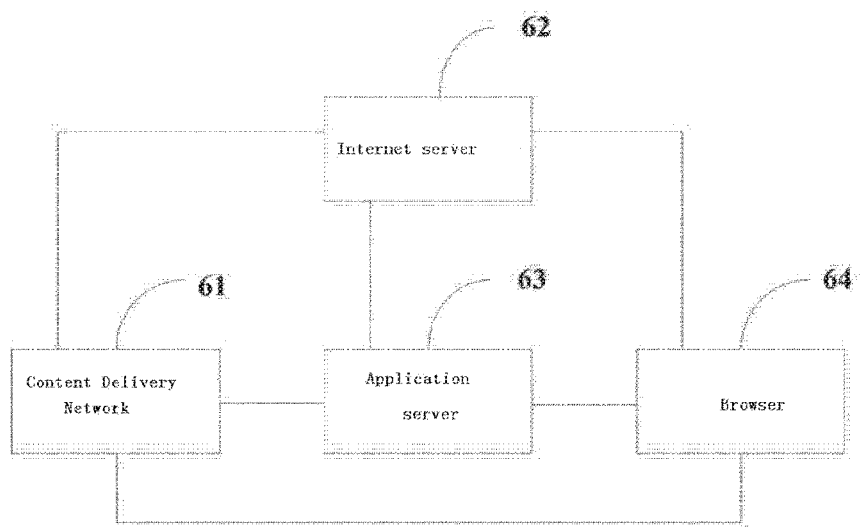
FIG. 6 is an application deployment diagram of a system for increasing a page loading rate provided in the embodiment of the present invention.

The embodiment of the invention provides a system for increasing a page loading rate, preferably, the server includes an Internet server and an application server. As shown in FIGS. 5 and 6, the system comprises: a Content Delivery Network 61, an Internet server 62, an application server 63, and a browser 64.

The Content Delivery Network 61 is specifically used for receiving the page framework request, determining whether or not a page framework is cached, and if not, sending the page framework request to the server, if so, sending the page framework to the browser 64.

The Internet server 62 is used for receiving the page framework request sent by the Content Delivery Network 61, determining whether or not a rendered page framework is cached, and if so, sending the rendered page framework to the browser 64, if not, sending the page framework request to the application server 63.

The application server 63 is used for rendering the page framework on the basis of the page framework request, and sending the rendered page framework to the Internet server 64.

Then the Internet server 62 is used for receiving the rendered page framework, caching the rendered page framework in a memory, and sending the rendered page framework to the browser 64 by means of the Content Delivery Network 61.

The Content Delivery Network 61 is specifically used for receiving the rendered page framework sent by the Internet server, caching the rendered page framework, and sending the rendered page framework to the browser 64.

The browser 64 is used for sending the page module request to the Content Delivery Network 61; and the Content Delivery Network 61 is specifically used for receiving the page module request, determining whether or not the rendered page module is cached, and if so, sending the rendered page module to the browser 64, if not, sending the page module request to the server.

The Internet server 62 is used for receiving the page module request, determining whether or not the rendered page framework request needs to be cached, and if not, sending the page module request to the server 63; if so, determining whether or not the rendered page module is cached, and if so, sending the rendered page module to the server 63, if not, sending the page module request to the application server 63.

The application server 63 is used for rendering the page module on the basis of the page module request, caching the rendered page module in the memory, and sending the rendered page module to the Internet server 63; and the Internet server 62 is used for receiving the rendered page module, caching the rendered page module in the memory, and sending the rendered page module to the Content Delivery Network 61.

The Content Delivery Network 61 is specifically used for determining whether or not a process of the server rendering a page module times out, and if not, populating the rendered page module into the rendered page framework to form a page, and sending the page to the browser 64; if so, ending the page module request.

In the method for increasing a page loading rate provided in the embodiment of the invention, by means of rendering the page framework and the page module asynchronously, the page rendering request is distributed, the module rendering speed is speeded up, and the page loading rate is increased.

It is noted that above are only preferred embodiments of the present invention and the technical principles used. It will be understood by those skilled in the art that the present invention is not limited to the specific embodiments described herein, and that various obvious changes, modifications and substitutions will be made by those skilled in the art without departing from the protection scope of the invention. Thus, although the present invention has been described in details by way of the above embodiments, the present invention is not limited to the above embodiments, but may include more other equivalent embodiments without departing from the inventive concept. The scope of the present invention is determined by the scope of the appended claims.

The invention claimed is:

1. A method for increasing a page loading rate, characterized in comprising:
   a Content Delivery Network receiving a page framework request sent by a browser, and launching the page framework request to a server;
   the server rendering a page framework on the basis of the page framework request, and sending the rendered page framework to the browser by means of the Content Delivery Network;
   the browser parsing the rendered page framework to obtain a page module identifier, and launching a page module request including the page module identifier to the server by means of the Content Delivery Network;
   the server rendering a page module on the basis of the page module request, and sending the rendered page module to the Content Delivery Network; and
   the Content Delivery Network populating the rendered page module into the rendered page framework to form a page on the basis of the page module identifier, and sending the page to the browser,
   wherein launching the page module request including the page module identifier to the server by means of the Content Delivery Network includes:
      the browser sending the page module request to the Content Delivery Network; and
      the Content Delivery Network receiving the page module request, determining whether or not the rendered page module is cached, and if not, sending the page module request to the server, and wherein the server rendering the page module on the basis of the page module request and sending the rendered page module to the Content Delivery Network includes:

an Internet server receiving the page module request, determining whether or not the rendered page framework request needs to be cached, if not, sending the page module request to an application server, if so, determining whether or not the rendered page module is cached, and if not, sending the page module request to the application server;

the application server rendering the page module on the basis of the page module request, caching the rendered page module in a memory, and sending the rendered page module to the Internet server; and the Internet server receiving the rendered page module, caching the rendered page module in a memory, and sending the rendered page module to the Content Delivery Network.

2. The method according to claim 1, wherein the Content Delivery Network receiving the page framework request sent by the browser and launching the page framework request to the server includes:

the Content Delivery Network receiving the page framework request, determining whether or not the rendered page framework is cached, and if not, sending the page framework request to the server.

3. The method according to claim 2, wherein server rendering the page framework on the basis of the page framework request and sending the rendered page framework to the browser by means of the Content Delivery Network includes:

an Internet server receiving the page framework request sent by the Content Delivery Network, determining whether or not the rendered page framework is cached, and if not, sending the page framework request to an application server;

the application server rendering the page framework on the basis of the page framework request, and sending the rendered page framework to the Internet server; and the Internet server receiving the rendered page framework, caching the rendered page framework in a memory, and sending the rendered page framework to the browser by means of the Content Delivery Network.

4. The method according to claim 3, wherein sending the rendered page framework to the browser by means of the Content Delivery Network includes:

the Internet server sending the rendered page framework to the Content Delivery Network, the Content Delivery Network receiving the rendered page framework, caching the rendered page framework, and sending the rendered page framework to the browser.

5. The method according to claim 1, wherein the Content Delivery Network populating the rendered page module into the rendered page framework to form the page on the basis of the page module identifier, and sending the page to the browser includes:

the Content Delivery Network determining whether or not a process of the server rendering a page module times out, if not, populating the rendered page module into the rendered page framework to form the page, and sending the page to the browser.

6. A system for increasing a page loading rate, characterized in comprising:

a Content Delivery Network;
a server; and
a browser, the Content Delivery Network being used for receiving a page framework request sent by the browser, and launching the page framework request to the server, the server being used for rendering a page framework on the basis of the page framework request, and sending the rendered page framework to the browser by means of the Content Delivery Network, the browser being used for parsing the rendered page framework to obtain a page module identifier, and launching a page module request including the page module identifier to the server by means of the Content Delivery Network, the server being used for rendering a page module on the basis of the page module request and sending the rendered page module to the Content Delivery Network, the Content Delivery Network being used for populating the rendered page module into the rendered page framework to form a page on the basis of the page module identifier, and sending the page to the browser, the browser being used for sending the page module request to the Content Delivery Network, the Content Delivery Network being used for receiving the page module request, determining whether or not the rendered page module is cached, and if not, sending the page module request to the server, the Internet server being used for receiving the page module request, determining whether or not the rendered page framework request needs to be cached, and if not, sending the page module request to the server, if so, determining whether or not the rendered page module is cached, and if not, sending the page module request to the application server, the application server being used for rendering the page module on the basis of the page module request, caching the rendered page module in the memory, and sending the rendered page module to the Internet server, and the Internet server being used for receiving the rendered page module, caching the rendered page module in the memory, and sending the rendered page module to the Content Delivery Network.

7. The system according to claim 6, wherein the Content Delivery Network is further used for receiving the page framework request, determining whether or not the rendered page framework is cached, and if not, sending the page framework request to the server.

8. The system according to claim 7, wherein the server includes an Internet server and an application server, the Internet server being used for receiving the page framework request sent by the Content Delivery Network, determining whether or not a rendered page framework is cached, and if not, sending the page framework request to the application server;

the application server being used for rendering the page framework on the basis of the page framework request, and sending the rendered page framework to the Internet server; and the Internet server being used for receiving the rendered page framework, caching the rendered page framework in a memory, and sending the rendered page framework to the browser by means of the Content Delivery Network.

9. The system according to claim 8, wherein the Content Delivery Network is further used for receiving the rendered page framework sent by the Internet server, caching the rendered page framework, and sending the rendered page framework to the browser.

10. The system according to claim 6, wherein the Content Delivery Network is further used for determining whether or not a process of the server rendering a page module times out, and if not, populating the rendered page module into the rendered page framework to form a page, and sending the page to the browser.

* * * * *